United States Patent [19]

Kroeger et al.

[11] Patent Number: 4,718,529
[45] Date of Patent: Jan. 12, 1988

[54] FRICTION FACE FOR A MAGNETIC COUPLING

[75] Inventors: Edward R. Kroeger, Beloit, Wis.; Richard C. Dvorak, Rockton, Ill.

[73] Assignee: Dana Corporation, Toledo, Ohio

[21] Appl. No.: 891,156

[22] Filed: Jul. 31, 1986

[51] Int. Cl.⁴ .............................................. F16D 69/00
[52] U.S. Cl. ........................... 192/107 R; 192/84 C; 192/107 M
[58] Field of Search ........... 192/107 R, 107 M, 70.14, 192/84 B, 84 C; 188/218 XL; 335/279

[56] References Cited

U.S. PATENT DOCUMENTS

| | | | |
|---|---|---|---|
| 2,541,979 | 2/1951 | Amundsen | 192/107 R |
| 2,982,385 | 5/1961 | Gamundi | 192/107 M X |
| 3,426,875 | 2/1969 | Stürmer | 192/84 C |
| 4,172,242 | 10/1979 | Myers et al. | 335/209 |
| 4,344,056 | 8/1982 | Kroeger et al. | 335/219 |
| 4,413,717 | 11/1983 | Kanamaru et al. | 192/84 C |
| 4,512,450 | 4/1985 | Babcock | 192/107 R X |

FOREIGN PATENT DOCUMENTS

| | | | |
|---|---|---|---|
| 1133604 | 7/1962 | Fed. Rep. of Germany | 192/107 M |
| 55720 | 5/1981 | Japan | 192/84 C |

Primary Examiner—Leslie Braun
Assistant Examiner—Richard M. Lorence
Attorney, Agent, or Firm—Leydig, Voit & Mayer

[57] ABSTRACT

The friction face of the rotor of an electromagnetic clutch is formed by a ring of molded friction material and by magnetic insets molded within the friction material and defining the magnetic pole pieces of the rotor. The inserts are formed with multiple shoulders which face in various directions and which interlock intimately with the friction material to prevent the inserts from shifting in any direction relative to the friction material. In addition, the inserts themselves are anchored directly to the rotor by screws in order to prevent the inserts from pulling away from the rotor and to promote uniform wearing of the inserts and the friction material.

14 Claims, 13 Drawing Figures

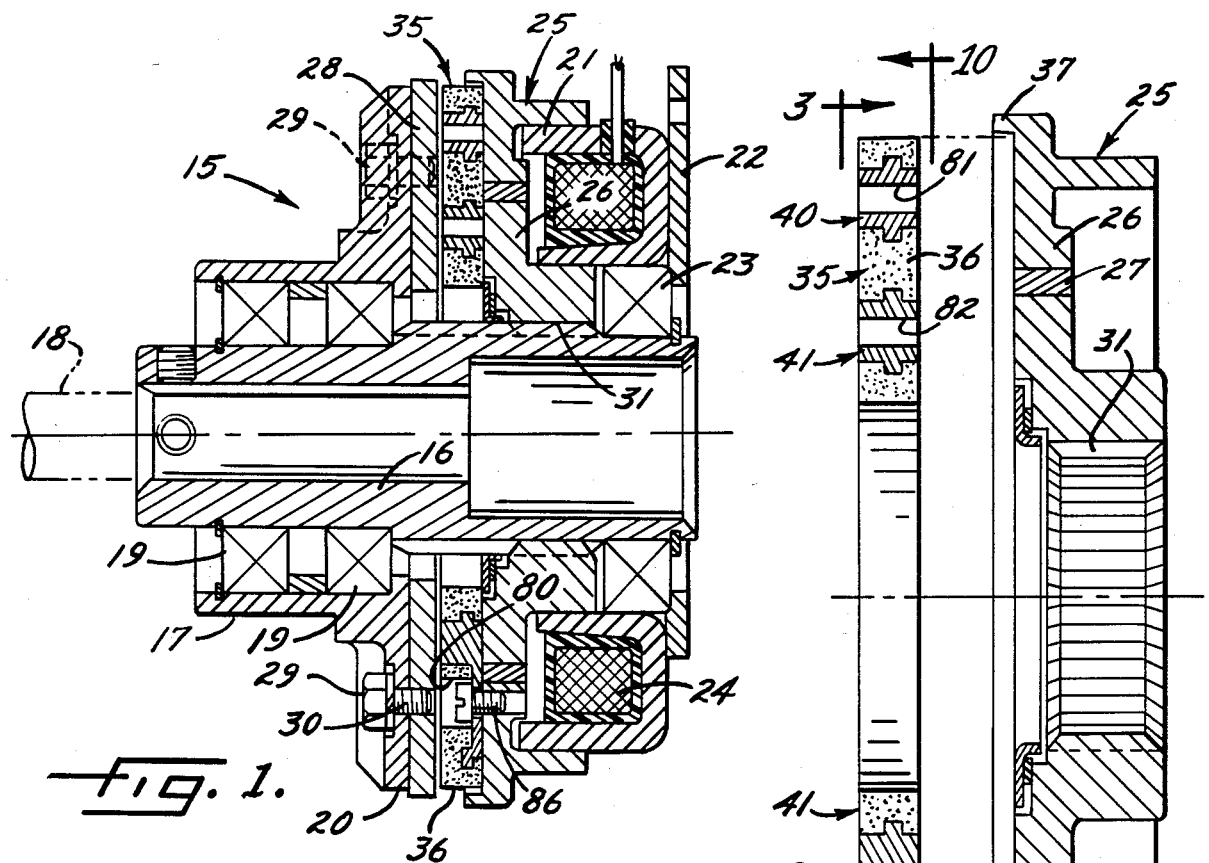
Fig. 1.
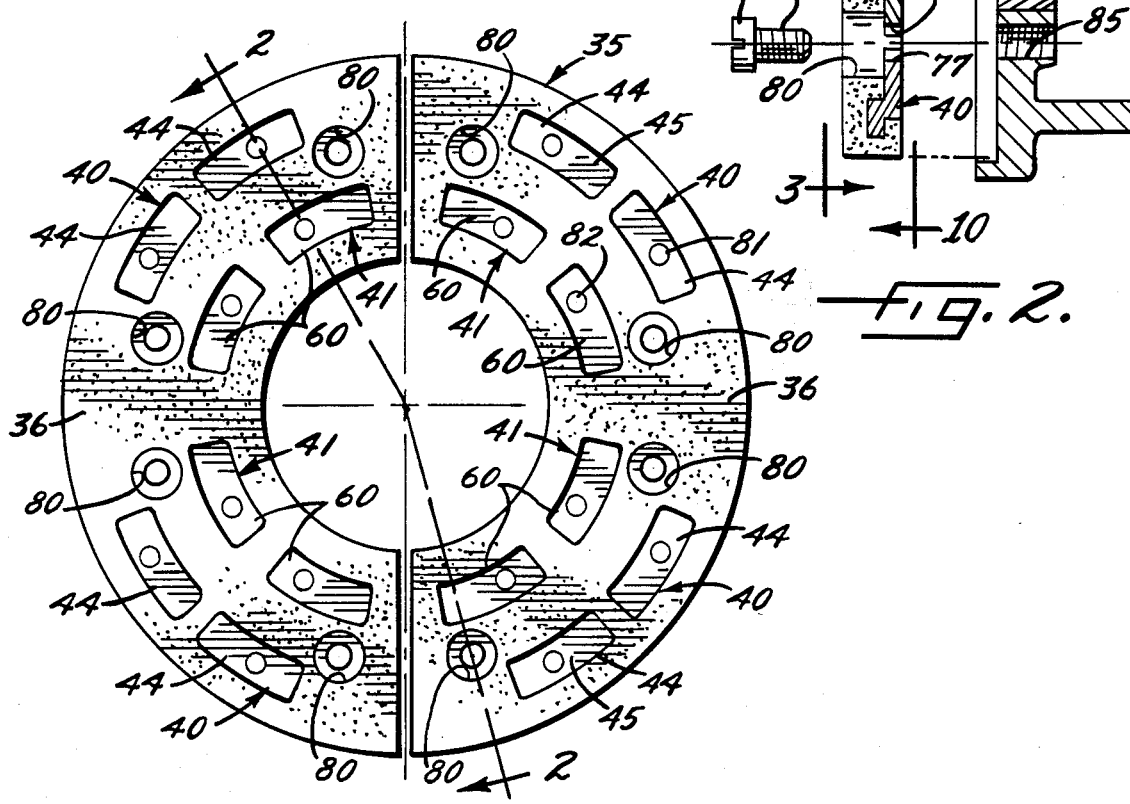
Fig. 2.
Fig. 3.

FRICTION FACE FOR A MAGNETIC COUPLING

BACKGROUND OF THE INVENTION

This invention relates generally to a friction face assembly for a magnetic coupling such as a clutch or a brake and, more particularly, to an assembly of the type in which the friction face may be easily removed from the coupling and replaced with a new friction face when the friction face becomes worn.

An easily replaceable friction face for a magnetic coupling is disclosed in Kroeger et al U.S. Pat. No. 4,344,056. In that instance, the friction face is formed by a sheet of friction material having parallel faces and having inserts made of magnetic material and defining the active pole faces of the magnetic coupling. The friction face preferably is made by molding the friction material around the inserts such that the inserts are located in place by the friction material with opposite faces of the inserts disposed flush with the faces of the friction material. The friction face thus formed is detachably secured to a magnetic mounting plate of the coupling and, when wear occurs, the entire friction face (i.e., the friction material and the inserts) may be easily removed and replaced.

In heavy duty couplings with high torque capacity, prior inserts tend to skew within the friction material due to differential expansion, high pressure and the like. Such skewing tends to create air gaps in the magnetic circuit and thereby reduces the efficiency of the coupling. Under extremely heavy duty service, prior inserts tend either to work loose from the friction material or to cause flexing of the friction material, tend to wear faster than the friction material and tend to pull away from the mounting plate. As a result, air gaps detrimental to the efficiency of the coupling are created between the inserts and the mounting plate and, in addition, the inserts and the friction material experience uneven wear.

SUMMARY OF THE INVENTION

One of the objects of the present invention is to provide a new and improved friction face of the foregoing type in which the inserts are locked more securely in place within the friction material so as to prevent detrimental skewing of the inserts and to keep the faces of the inserts parallel and flush with the faces of the friction material.

A more detailed object is to achieve the foregoing by forming the inserts with unique shoulders which intimately interlock with the friction material in order to prevent the inserts from moving within the friction material in any direction.

Another important object of the invention is to reduce the possibility of air gaps between the inserts and the mounting plate and to promote more uniform wearing of the inserts and the friction material. This is achieved by anchoring the inserts themselves directly to the mounting plate. As a result of such anchoring, the inserts are prevented from pulling away from the mounting plate and, in addition, the inserts resist flexing or movement of the friction material.

The invention also resides in the novel manner of anchoring a multiplicity of inserts to the mounting plate with fasteners which are uniquely arranged to enable easy replacement of the friction face while avoiding magnetic bridging between inserts of opposite polarity.

These and other objects and advantages of the invention will become more apparent from the following detailed description when taken in conjunction with the accompanying drawings.

BRIEF DESCRIPTION OF THE DRAWINGS

FIG. 1 is a cross-sectional view taken axially through a typical magnetic coupling equipped with a new and improved replaceable friction face incorporating the unique features of the present invention.

FIG. 2 is an enlarged view of the friction face illustrated in FIG. 1 and shows the friction face in exploded relation with its mounting member, the view of the friction face being taken substantially along the line 2—2 of FIG. 3.

FIG. 3 is a front elevational view of the friction face as seen along the line 3—3 of FIG. 2.

DETAILED DESCRIPTION OF THE PREFERRED EMBODIMENT

Figure 4:
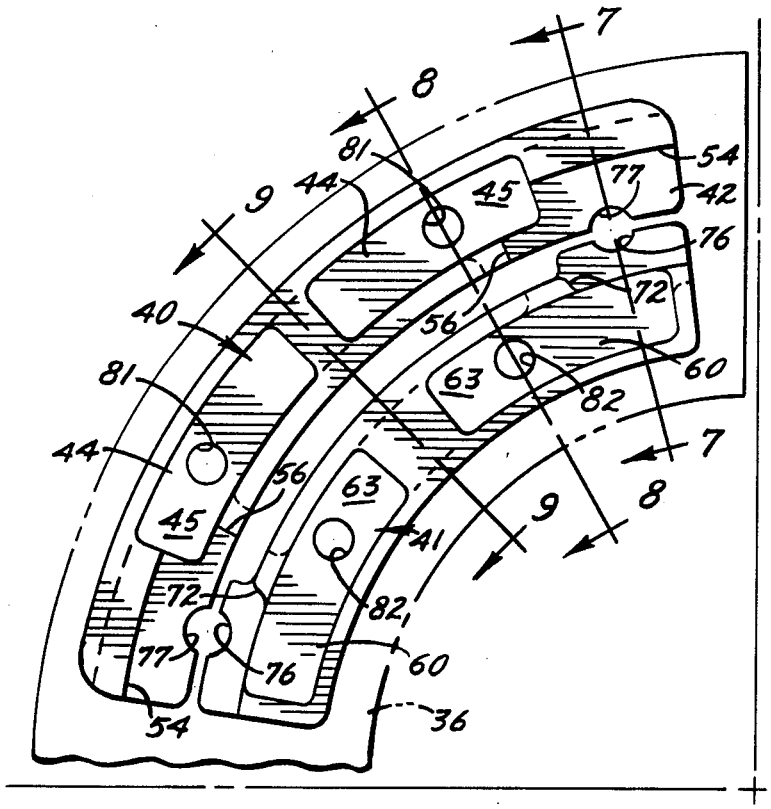
FIG. 4 is a front elevational view of one outer insert and one inner insert of the friction face.

For purposes of illustration, the invention is shown in the drawings in conjunction with an electromagnetic coupling which herein is a clutch 15 for selectively transmitting torque from a rotary input member 16 to a rotary output member 17. In this instance, the input member is a sleeve adapted to be rotated by a shaft 18 which may be telescoped into and secured rigidly to the sleeve. The output member is a hub journaled on the sleeve by a pair of bearings 19 and formed with a radially extending flange 20.

The clutch 15 includes an annular field member 21 of U-shaped cross-section and supported in a stationary position by a fixed mounting bracket 22. A bearing 23 is located between the field member 21 and the input sleeve 16 to permit the latter to rotate within the former. Disposed within the field member is a multiturn coil 24 which, when excited by a suitable dc voltage source, causes magnetic flux to thread out of one leg of the U-shaped field member and back into the other leg of the field member.

Surrounding the forward portion of the field member 21 and connected to rotate with the input sleeve 16 is a rotor 25 having a generally circular and radially extending plate 26 (FIG. 2) located adjacent the free ends of the legs of the field member. The rotor is made of steel or other magnetic material and its plate 26 includes an annular band 27 of nonmagnetic material which separates the rotor into inner and outer annular sections of opposite magnetic polarity.

Disposed in opposing relation with the plate 26 of the rotor 25 is a circular armature 28 (FIG. 1) made of steel. The armature preferably is formed as two semi-circular halves which are fastened to the flange 20 of the output hub 17 by eight angularly spaced screws 29 extending through alined holes 30 in the armature and the flange. By removing the screws, the two semi-circular halves of the armature may be slipped radially outwardly away from the input sleeve 16 for repair or replacement.

The inner diameter of the rotor 25 is splined to the input sleeve 16 as indicated at 31 so as to enable the rotor to move axially toward and away from the armature 28. When the coil 24 is excited, magnetic flux crosses the air gap between the rotor and the armature and attracts the rotor axially toward the armature. The rotor frictionally engages the armature and thereby couples the armature and the output hub 17 to rotate in unison with the rotor and the input sleeve 16. When the coil 24 is de-energized, the rotor no longer is magnetically attracted to the armature and no longer engages the armature with any significant frictional force. Accordingly, the input sleeve 16 rotates without transmitting any significant torque to the output hub 17.

To establish tight frictional engagement between the rotor 25 and the armature 28, the rotor carries a friction face 35 (FIG. 2) which also defines the magnetic poles of the rotor. Herein, the friction face preferably is defined by two semi-circular sheets 36 (FIG. 3) of friction material (e.g., material similar to brake lining) which, when fit together, define a circular ring. The rear face of the friction ring 36 is parallel to the forward face thereof and lies in face-to-face relation with the forward face of the mounting plate 26 of the rotor 25. An axially projecting annular flange 37 (FIG. 2) is formed integrally with the outer periphery of the mounting plate and encircles the outer periphery of the rear portion of the friction ring.

Figure 10:
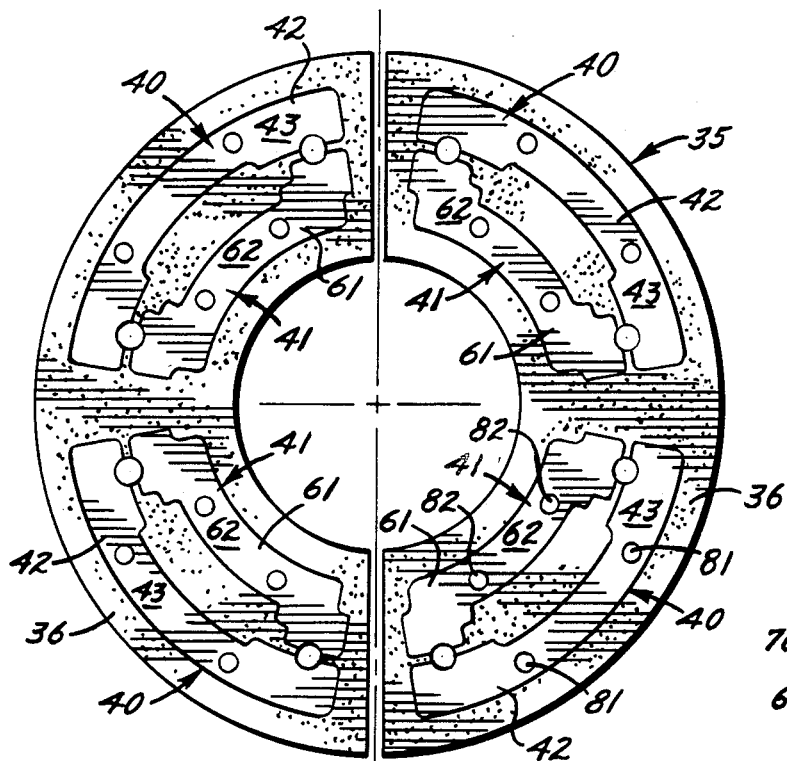
FIG. 10 is a rear elevational view of the friction face as seen along the line 10—10 of FIG. 2.

Located within the friction material 36 are inserts 40 and 41 which are made of steel or other low reluctance magnetic material and which define the poles of the rotor 25. The inserts 40 are outer inserts located adjacent the outer periphery of the friction ring 36 there herein being a row of four outer inserts (see FIG. 10) spaced circumferentially from one another around the ring. Four inserts 41 which define inner inserts are spaced radially inwardly from the outer inserts and also are spaced circumferentially from one another around the ring. Each inner insert 41 is substantially alined in a circumferential direction with an outer insert. The outer inserts define magnetic poles of one polarity while the inner inserts define magnetic poles of the opposite polarity. When the coil 24 is excited, flux from the outer leg of the field member 21 passes through the outer inserts 40 to the armature 28 and then returns from the armature through the inner inserts 41 and back to the inner leg of the field member.

The inserts 40 and 41 preferably are sintered from powdered metal. Initially, the friction material of the ring 36 also is in powder form. To make the friction face 35, the inserts are located in an appropriate mold. Thereafter, the mold is filled with powdered friction material which then is subjected to heat and pressure. The particulate friction material thus becomes bonded together to form the ring halves and also becomes bonded to the inserts to hold the inserts in place in the friction material.

In accordance with one aspect of the present invention, the inserts 40 and 41 are formed with unique shoulder means which tightly interlock with the friction material of the ring 36 to hold the inserts rigidly against shifting in any direction relative to the ring. As will be explained in more detail subsequently, such interlocking prevents the inserts from skewing relative to the ring and holds the faces of the inserts in precisely parallel relation with the front and rear faces of the ring. As a result, an air gap of constant narrow width is maintained between the armature 28 and the friction face 35 and, in addition, detrimental air gaps between the friction face and the mounting plate 26 of the rotor 25 are avoided.

Figure 5:
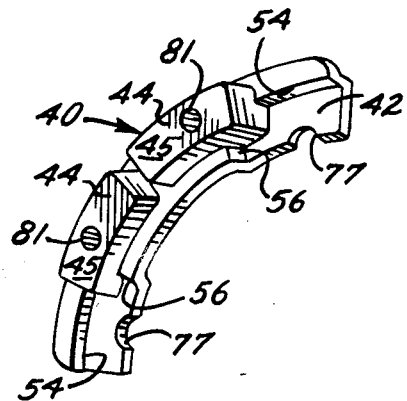
FIGS. 5 and 6 are perspective views, on a reduced scale, of the outer and inner inserts, respectively, of FIG. 4 as seen from the front sides of the inserts.
Figure 12:
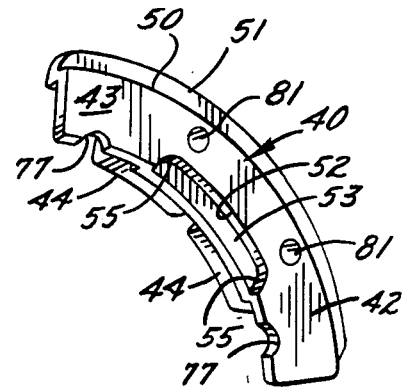
FIGS. 12 and 13 are perspective views, on a reduced scale, of the outer and inner inserts, respectively, of FIG. 11 as seen from the rear sides of the inserts.

More specifically, the rear portion of each outer insert 40 is formed by an elongated and relatively thin arcuate plate 42 (FIG. 12). The extreme rear face 43 of the plate is flat and planar and defines the rear face of the insert. Formed integrally with and projecting forwardly from the forward side of the plate are two circumferentially spaced blocks 44 (FIG. 5) whose forward faces 45 define the extreme forward faces or pole faces of the insert.

In carrying out the invention, each outer insert 40 is formed with shoulder means which intimately engage the friction material of the ring 36 to prevent the insert from shifting radially, circumferentially and axially relative to the friction material. As shown in FIG. 12, the entire length of the outer edge portion of the rear face 43 of the plate 42 is formed with an arcuate groove which defines an arcuate shoulder 50 facing in a radially outwardly direction and also a shoulder 51 facing axially rearwardly. Intermediate the ends of the inner edge portion of the rear face 43 the plate 42 is formed with an arcuate groove which defines a radially inwardly facing shoulder 52 and an axially rearwardly facing shoulder 53. The two oppositely facing radial shoulders 50 and 52 abut the friction material of the ring 36 and prevent any radial shifting of the rear portion of the insert 40. In addition, radially inward shifting of the insert 40 is prevented by two radially extending shoulders 54 (FIG. 5) on the forward side of the plate 42 and extending from the ends of the blocks 44. The radially inner and outer sides of the blocks 44 define shoulder means which also help prevent radial shifting of the outer insert.

The rearwardly facing axial shoulders 51 and 53 of each outer insert 40 intimately engage the friction material of the ring 36 to prevent rearward axial shifting of the insert. Forward axial shifting of the insert is prevented by the forward side of the plate 42 engaging the friction material, such side defining a shoulder facing oppositely of the shoulders 51 and 53.

Figure 11:
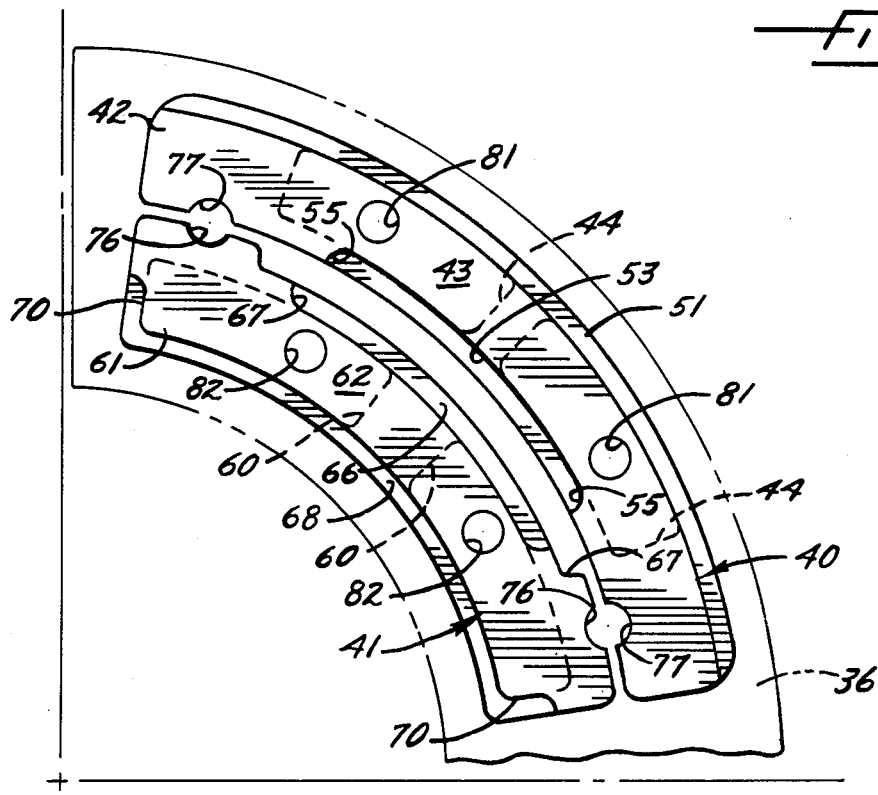
FIG. 11 is a rear elevational view of one outer insert and one inner insert of the friction face.

Circumferential shifting of each outer insert 40 is prevented by virtue of the friction material of the ring 36 engaging circumferentially oppositely facing shoulders defined by the two ends of each block 44. In addition, circumferentially oppositely facing shoulders 55 (FIGS. 11 and 12) are defined at the rear face 43 of the plate 42 by the ends of the groove adjacent the shoulders 52 and 53. Two additional circumferentially oppositely facing shoulders 56 (FIGS. 4 and 5) are defined at the ends of a rib on the forward side of the plate 42 adjacent the inner edge thereof, the inner side of the rib forming yet another radially inwardly facing shoulder.

By virtue of the various shoulders referred to above, each outer insert 40 is tightly locked within the friction material of the ring 36 and is prevented from skewing. Accordingly, the outer active pole faces 45 of the blocks 44 remain precisely parallel to the forward side of the ring 36 to maintain an air gap of constant axial width between the friction face 35 and the armature 28 even though the ring and the inserts are subjected to high pressure and even though the steel inserts and the friction material expand differentially when subjected to high temperature.

Figure 6:
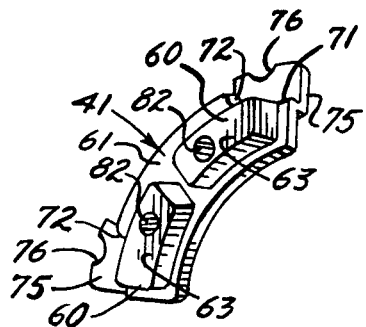
Figures 7, 8, 9:
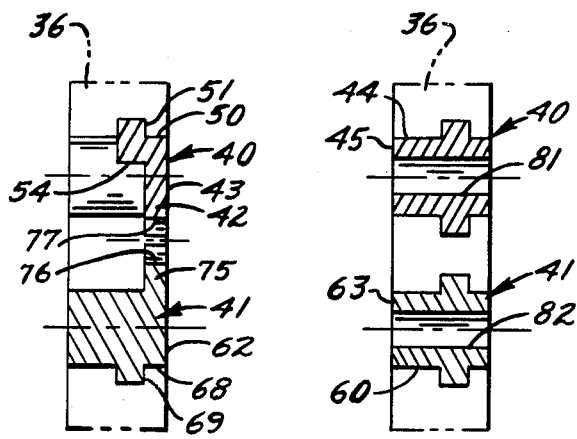
FIGS. 7, 8, and 9 are cross-sections taken substantially along the lines 7—7, 8—8 and 9—9, respectively, of FIG. 4.

The inner inserts 41 are constructed generally similar to the outer inserts 40 in order to enable the inner inserts also to interlock tightly with the friction material of the ring 36. As shown in FIGS. 4 and 6, each inner insert 41 comprises two circumferentially spaced blocks 60 which are formed integrally with and project forwardly from the forward side of an elongated arcuate plate 61 having a flat and planar rear side 62. The rear side of the plate defines the rear face of the insert while the extreme forward sides 63 of the blocks define the pole faces of the insert.

Figure 13:
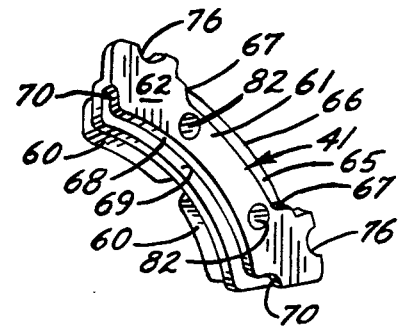

An arcuate groove (FIG. 13) is formed in the outer edge portion of the rear face 62 of each plate 61 and defines an arcuate shoulder 65 facing radially outwardly, a shoulder 66 facing axially rearwardly and a pair of oppositely facing circumferential shoulders 67. Formed along the inner edge portion of the rear face 62 of the plate 61 is an arcuate groove which defines a radially inwardly facing shoulder 68, an axially rearwardly facing shoulder 69 and a pair of oppositely facing circumferential shoulders 70.

The forward side of each plate 61 also is formed with a radially outwardly facing shoulder 71 (FIG. 6) which coacts with the radially inner and outer sides of the blocks 60 to help prevent radial shifting of the inner insert 41. Circumferential shifting of the inner insert also is prevented by the circumferentially oppositely facing shoulders defined by the two ends of each block 60 and by two additional circumferentially oppositely facing shoulders 72 defined by the ends of a rib on the forward side of the plate 61 adjacent the outer edge thereof. The outer side of the rib defines yet another radially outwardly facing shoulder while the forward side of the plate 61 defines a shoulder facing oppositely of the shoulders 66 and 69 and acting to prevent forward axial shifting of the inner insert 41. Accordingly, the inner inserts 41 are tightly interlocked with the friction material of the ring 36 and are prevented from shifting in any direction relative to the friction material.

Even though the outer and inner inserts are interlocked rigidly with the friction material of the ring 36, the friction material itself has a tendency to flex under the high heat and pressure applied to the friction face 35 during heavy duty operation. In accordance with another aspect of the invention, the inserts 40 and 41 themselves are locked directly to the mounting plate 26 of the rotor 25 in order to reduce flexing of the friction material and to hold the rear sides of the inserts tightly against the mounting plate and thereby avoid air gaps between the inserts and the mounting plate.

More specifically, the radially outer edge of the plate 61 of each inner insert 41 is formed with a pair of circumferentially spaced and radially outwardly projecting mounting ears 75 (FIG. 6) whose outer edges are formed with generally semi-circular notches 76 which open outwardly. Generally semi-circular and circumferentially spaced notches 77 (FIG. 5) are formed in the radially inner edge of the plate 42 of each outer insert 40 and are alined circumferentially with the notches 76 of the circumferentially alined inner insert. The radially outer edges of the mounting ears 75, are disposed closely adjacent to but are spaced radially from the radially inner edge of the outer insert 41 and thus each alined pair of notches 76 and 77 tends to approximate a full circle.

When the friction face 35 is formed by molding the friction material of the ring 36, a core pin (not shown) is placed in each pair of alined notches 76 and 77 and, as a result, a hole whose location corresponds to the location of the notches is formed through the friction material. An enlarged counterbore 80 (FIG. 2) is molded in the friction material 36 forwardly of each hole, the counterbore resulting from the shape of the core pin. The several core pins help locate the inserts in the mold and, in addition, the inserts are fixtured very rigidly in the mold by locating pins (not shown) which extend through holes 81 formed through the blocks 44 and the plate 42 of each outer insert 40 and holes 82 formed through the blocks 60 and the plate 61 of each inner insert 41.

By virtue of the alined notches 76 and 77 of the four pairs of inserts 40 and 41, eight circumferentially spaced holes are formed through the friction face 35. Such holes are alined with circumferentially tapped holes 85 (FIG. 2) in the mounting plate 26 of the rotor 25. Fasteners which herein are in the form of cap screws 86 are threaded into the holes 85 with the heads 87 of the screws bearing against the bottoms of the counterbores 80. When the screws are tightened, their heads clamp against the inserts and thus anchor the inserts directly and rigidly to the mounting plate 26 of the rotor 25. The screws are made of brass or other non-magnetic material in order to avoid magnetic bridges between the opposite poles defined by the outer and inner inserts.

With the inserts 40 and 41 anchored directly and rigidly to the mounting plate 26 of the rotor 25 by the screws 86, the rear faces 43 and 62 of the inserts are held in tight and permanent face-to-face engagement with the mounting plate and are prevented from pulling away therefrom as the forward or active face of the friction face 35 wears during service use. Accordingly, air gaps detrimental to the efficiency of the clutch 15 are prevented from developing between the inserts and the mounting plate. In addition, anchoring of the inserts directly to the mounting plate promotes more uniform wear of the inserts and the friction material of the ring 36 and reduces the tendency of the inserts to wear at a faster rate than the friction material.

Advantageously, the holes defined by the alined notches 76 and 77 are located on the same diameter as the holes 30 through the armature 28 and the flange 20 of the output hub 17 (see FIG. 1). Accordingly, after the armature 28 has been removed by removing the screws 29, a screwdriver may be inserted through the holes 30 to enable access to the screws 86. After those screws have been removed, the friction face 35 may be removed from the clutch 15 simply by slipping the two ring halves 36 radially outwardly.

From the foregoing, it will be apparent that the present invention brings to the art a clutch 15 with a new and improved friction face 35 whose pole pieces or inserts 40 and 41 are anchored rigidly within the friction material of the ring 36 and directly to the mounting plate 26 to improve efficiency and promote uniform wear. While the friction face has been disclosed specifically as being on the rotor 25 of a clutch, those familiar with the art will appreciate that the friction face could be used equally well as the stationary face of a magnetic brake or as the friction face of the armature of either a clutch or a brake.

We claim:

1. A friction face for a magnetic coupling, said friction face comprising a substantially flat and planar sheet formed of molded friction material and having parallel faces, inserts made of low reluctance magnetic material located-in-place within said molded sheet by the friction material and having parallel faces which are flush with the faces of said sheet, each of said inserts comprising an elongated plate disposed in the plane of said sheet, each of said inserts having shoulder means integral with said plate and disposed in intimate engagement with the friction material of said sheet for preventing said inserts from shifting relative to said sheet in either direction along the thickness of the sheet and for preventing said inserts from shifting relative to the sheet in any direction in the plane of the sheet thereby to lock the inserts securely within the sheet and to keep the faces of the inserts flush with the faces of the sheet, each of said inserts including a block formed integrally with and projecting from one side of the respective plate and having a face defining at least part of one of the said faces of the insert, the other said face of the insert being defined by the opposite side of said plate and being of substantially greater area than said one face.

2. A friction face as defined in claim 1 in which said shoulder means comprising first and second oppositely facing shoulders disposed within the plane of said sheet, third and fourth oppositely facing shoulders extending transversely of said plane, and fifth and sixth oppositely facing shoulders extending transversely of said plane and also extending transversely of said third and fourth shoulders.

3. A friction face as defined in claim 1 in which each of said inserts includes a second block formed integrally with and projecting from said one side of said plate, the second block being spaced along said plate from said first block.

4. A friction face as defined in claim 1 in which each of said inserts is formed with an opening for receiving an elongated fastener.

5. A friction face as defined in claim 4 in which each of said openings comprises a notch formed in one edge of said insert.

6. A friction face as defined in claim 2 in which one edge of each of said plates is formed with a notch for receiving a elongated fastener.

7. A friction face assembly for a magnetic coupling, said assembly comprising a mounting plate made of low reluctance magnetic material, an at least partially circular sheet formed of molded friction material and having parallel faces, one of said faces being disposed in face-to-face relation with said mounting plate, inner and outer radially spaced rows of circumferentially spaced inserts, said inserts being made of low reluctance magnetic material located-in-place within said molded sheet by said friction material and having parallel faces which are substantially flush with the faces of said sheet, each of said inserts comprising an elongated plate disposed in the plane of said sheet, each of said elongated plates having at least two shoulders which face radially opposite of one another, having at least two shoulders which face circumferentially opposite of one other and having at least two shoulders which face axially opposite of one another, each of said shoulders being in intimate abutting engagement with said friction material and preventing said inserts from shifting radially, circumferentially and axially relative to said sheet, each of said inserts further comprising a block formed integrally with and projecting axially from one side of the respective elongated plate and having a face defining one of the said faces of the insert, the other side of said elongated plate defining the other face of the insert, openings formed in said inserts, and elongated fastener means extending through said openings and connected to said mounting plate to secure said sheet and said inserts to said mounting plate and to prevent said inserts from being pulled away from said mounting plate.

8. A friction face assembly as defined in claim 7 in which each inner insert is spaced radially from and is alined circumferentially with a respective outer insert, said openings comprising notches formed in the elongated plates of said inserts, there being at least one radially outwardly opening notch formed in the radially outer edge of the elongated plate of each inner insert, there being at least one radially inwardly opening notch formed in the radially inner edge of the elongated plate of each outer insert and being disposed in circumferential alinement with the notch of the circumferentially alined inner insert, said fastener means comprising elongated fasteners extending through each pair of alined notches and clamped against the elongated plates of said inserts.

9. A friction face assembly as defined in claim 8 in which each fastener is made of a material having high magnetic reluctance.

10. A friction face for a magnetic coupling, said friction face comprising an at least partially circular sheet formed of molded friction material and having parallel faces, inner and outer inserts made of low reluctance material located-in-place within the molded sheet by the friction material and having parallel faces which are flush with the faces of said sheet, each inner insert being spaced radially inwardly from and being alined circumferentially with a respective outer insert, each of said inserts having at least two shoulders which face radially opposite of one another, having at least two shoulders which face circumferentially opposite of one another, and having at least two shoulders which face axially opposite of one another, each of said shoulders being in intimate engagement with said friction material and preventing said inserts from shifting radially, circumferentially and axially relative to said sheet, at least one radially outwardly opening notch formed in the radially outer edge of each inner insert, at least one radially inwardly opening notch formed in the radially inner edge of each outer insert and disposed in circumferential alinment with the notch of the circumferentially alined inner insert, each pair of alined notches defining an opening for receiving an elongated fastener.

11. A friction face assembly for a magnetic coupling, said assembly comprising a mounting plate made of low reluctance magnetic material, a sheet formed of molded friction material and having oppositely facing parallel faces, one of said faces being disposed in face-to-face engagement with said mounting plate, the other of said faces being fully exposed and defining the working friction face of said assembly, inserts made of low reluctance magnetic material located-in-place within said molded sheet by said friction material and having oppositely facing parallel faces which are substantially flush with the faces of said sheet, openings formed in said inserts, and elongated fastener means extending through said openings and connected to said mounting plate to secure said sheet and said inserts to said plate and to prevent said inserts from being pulled away from said plate.

12. A friction face assembly as defined in claim 11 in which a first one of said inserts defines a magnetic pole of one polarity and in which a second one of said inserts defines a magnetic pole of opposite polarity, said first insert being spaced from said second insert, said openings comprising notches formed in adjacent sides of said first and second inserts and disposed in alinement with one another, and said fastener means comprising a fastener extending through said alined notches and clamped against said first and second inserts.

13. A friction face assembly as defined in claim 11 in which said inserts are formed with integral shoulder means disposed in intimate engagement with said friction material of said sheet for preventing said inserts from shifting relative to said sheet in either direction along the thickness of the sheet and for preventing said inserts from shifting relative to the sheet in any direction in the plane of the sheet thereby to lock said inserts securely within the sheet and to keep the faces of the inserts flush with the faces of the sheet.

14. The combination of, an armature assembly and an opposing friction face assembly for a magnetic coupling, said friction face assembly comprising a mounting plate made of low reluctance magnetic material, a sheet formed of molded friction material and having oppositely facing parallel faces, one of said faces being disposed in face-to-face relation with said mounting plate, inserts made of low reluctance magnetic material located-in-place within said molded sheet by said friction material and having oppositely facing parallel faces which are substantially flush with the faces of said sheet, openings formed in said inserts, elongated fastener means extending through said openings and connected to said mounting plate to secure said sheet and said inserts to said plate and to prevent said inserts from being pulled away from said plate, said armature assembly comprising a mounting flange and further comprising an armature, alined holes formed through said mounting flange and said armature, fasteners extending through said holes and securing said armature to said flange, said holes being alined with said openings whereby, when said fasteners are removed from said holes, access to said fastener means may be gained by way of said holes.

* * * * *